US010278034B1

(12) United States Patent
Saptharishi et al.

(10) Patent No.: US 10,278,034 B1
(45) Date of Patent: Apr. 30, 2019

(54) AUDIO PROCESSING SYSTEM AND METHOD USING PUSH TO TALK (PTT) AUDIO ATTRIBUTES

(71) Applicant: HONEYWELL INTERNATIONAL INC., Morris Plains, NJ (US)

(72) Inventors: Sivaraman Saptharishi, Tamil Nadu (IN); Vasantha Selvi Paulraj, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/926,115

(22) Filed: Mar. 20, 2018

(51) Int. Cl.
H04B 7/00 (2006.01)
H04W 4/10 (2009.01)
H04B 7/185 (2006.01)
G06F 3/048 (2013.01)

(52) U.S. Cl.
CPC .............. *H04W 4/10* (2013.01); *G06F 3/048* (2013.01); *H04B 7/18506* (2013.01)

(58) Field of Classification Search
USPC ...................................... 455/518, 519, 186.1
See application file for complete search history.

(56) References Cited

U.S. PATENT DOCUMENTS

| 7,912,592 | B2 | 3/2011 | Komer et al. | |
|---|---|---|---|---|
| 9,430,949 | B1 | 8/2016 | Nelson | |
| 2007/0054686 | A1* | 3/2007 | Allen | H04W 76/45 455/518 |
| 2013/0252563 | A1* | 9/2013 | Peterson | H04B 1/48 455/83 |
| 2015/0180567 | A1 | 6/2015 | Apostolakos et al. | |
| 2016/0379650 | A1 | 12/2016 | Joshi et al. | |

FOREIGN PATENT DOCUMENTS

CN 101916565 A 12/2010

OTHER PUBLICATIONS

Hofbauer, Konrad and Stefan Petrik, "ATCOSIM Air Traffic Control Simulation Speech Corpus," Graz University of Technology, Technical Report, May 2008.
Neffe, Michael, et al., "Speaker Segmentation for Air Traffic Control," Research Gate, Graz University of Technology, obtained Feb. 9, 2018.
Prinzo, O. Veronika, Terminal Radar Approach Control: Measures of Voice Communication System Performance, Proceedings of the Human Factors and Ergonomics Society 49 Annual Meeting 2005.

* cited by examiner

*Primary Examiner* — Tu X Nguyen
(74) *Attorney, Agent, or Firm* — Lorenz & Kopf, LLP

(57) ABSTRACT

Methods and systems for audio processing using push to talk (PTT) audio attributes to distinguish utterances are provided. The system receives an audio stream comprising two or more utterances. The system includes a control module comprising a processor and a memory, the control module being configured to receive the audio stream; store, in real time, the audio stream in a current buffer in the memory; break the audio stream into a plurality of time segments of equal size; and for each time segment of the plurality of time segments, process the time segment with a push to talk (PTT) audio attribute to look for a PTT event, defined as a PTT button is released; and upon identifying the PTT event, respond to the identified PTT event by, (i) closing the current buffer, (ii) opening a new data storage location, and (iii) defining the new data storage location as the current buffer.

20 Claims, 4 Drawing Sheets

AUDIO PROCESSING SYSTEM AND METHOD USING PUSH TO TALK (PTT) AUDIO ATTRIBUTES

TECHNICAL FIELD

The present invention generally relates to audio processing systems, and more particularly relates to audio processing methods and systems that identify utterances using push to talk (PTT) audio attributes.

BACKGROUND

In some scenarios, communication between air traffic control (ATC) and a pilot may be inefficient. Example scenarios include noisy environments, accents, distractions, and other cockpit noises. In these scenarios pilots may have to ask the controller at air traffic control (ATC) to repeat commands and information again, to clarify any confusion.

As a result, real-time transcription aids which help the pilot understand the ATC audio content carried by the communication radios are desirable. For example, a transcription aid that identifies the tail number of a referenced aircraft in an ATC message would quickly allow a pilot to distinguish between the ATC messages meant for the ownship and the ones meant for neighboring traffic. Such transcription aids may increase certainty on a clearance, aid memory, and help pilots adhere accurately to ATC instructions.

However, an ATC transcription system may operate on a communication radio channel tapped from the aircraft audio panel. As the audio panel is used for all sorts of voice communication, the communication radio channel may comingle ATC communication with various audio signals, such as, traffic pilot conversation, co-pilot, intercom, Morse code, aural alerts/warning from cockpit system, ATIS, and the like. These technological challenges make performing reliable and accurate real-time ATC transcription difficult.

Accordingly, improved audio processing methods and systems are desired. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for audio processing. The method is performed in a control module, and comprises the steps of: initializing a data storage location defined as a current buffer; receiving, from an audio panel, an audio stream; responsive to receiving the audio stream, repeating the steps of: storing, in real time, the audio stream in the current buffer; identifying a push-to-talk (PTT) event by processing the audio stream based on (PTT) audio attribute, a PTT event defined as determining that a PTT button was released; and responding to the identified PTT event by, (i) closing the current buffer, (ii) opening a new data storage location, and (iii) defining the new data storage location as the current buffer.

In another aspect, a system for audio processing is provided. The system comprising: an audio panel for providing an audio stream comprising two or more utterances; and a control module comprising a processor and a memory, the control module configured to, receive the audio stream; store, in real time, the audio stream in a current buffer in memory; break the audio stream into a plurality of time segments of equal size; and for each time segment of the plurality of time segments, process the time segment with a push-to-talk (PTT) audio attribute to look for a PTT event, a PTT event defined as a PTT button is released; and upon identifying the PTT event, respond to the identified PTT event by, (i) closing the current buffer, (ii) opening a new data storage location, and (iii) defining the new data storage location as the current buffer.

Also provided is an Air Traffic Control (ATC) transcription module. The ATC transcription module comprising: a processor and a memory, the processor configured to, receive an audio stream comprising an ATC utterance; store, in real time, the audio stream in a current buffer in memory; break the audio stream into a plurality of time segments of equal size; and for each time segment of the plurality of time segments, generate a complex modulus (CM) segment by performing a fast Fourier transform (FFT) and a complex modulus on the time segment; process the CM segment with a push-to-talk (PTT) audio attribute to look for a PTT event, a PTT defined as a PTT button is released; and upon identifying the PTT event, respond to the identified PTT event by, (i) closing the current buffer, (ii) opening a new data storage location in memory, and (iii) defining the new data storage location as the current buffer.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Exemplary embodiments of the novel disclosed audio processing system (FIG. 1, 102) provide a technologically improved audio processing system and method for identifying utterances within an audio stream (FIG. 1, 107) in real-time. As used herein, "real-time" is interchangeable with current and instantaneous. The audio stream 107 is expected to be complex, i.e., comprising multiple analog audio signals comingled, each of the audio signals being from a different audio source. The audio processing system 102 employs a model in which a push to talk (PTT) button is pressed to begin an utterance, an utterance occurs, and then the PTT button is released at the end of an utterance (as used herein, a PTT event is defined as an occurrence of a PTT button being released). In this manner, the audio processing system 102 uses PTT events to distinguish between utterances.

As used herein, "buffering" means storing data in a data storage location referred to as a buffer. The disclosed audio processing system 102 generally buffers a received audio stream 107, as data, in real-time as it is received. The buffering action is responsive to PTT events, such that each section of audio stream 107 between two PTT events is stored or buffered into a new buffer 166. Therefore, the content of each buffer 166 corresponds to a single respective utterance. A program (FIG. 2, 162) executed by the audio processing system 102 variously utilizes fast Fourier transforms (FFT), complex modulus calculations, and a predefined library of audio attributes associated with activation of PTT devices in identifying that a PTT event has occurred, and informs the buffering of the audio stream 107 based thereon. The disclosed audio processing system 102 and methods are described in more detail below.

Figure 1:
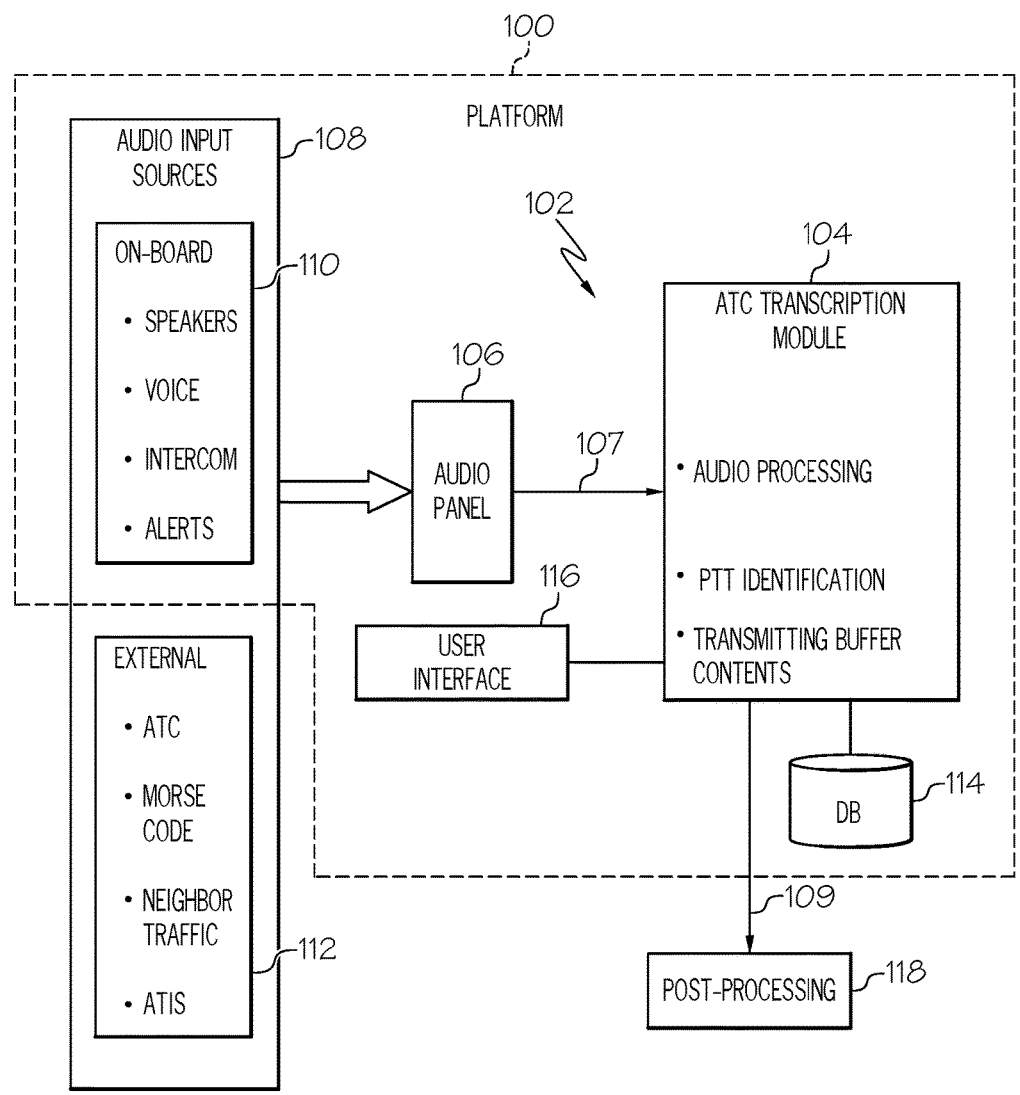
FIG. 1 is a block diagram of an audio processing system, in accordance with an exemplary embodiment.

Turning now to FIG. 1, in an embodiment, the audio processing system 102 (also referred to herein as "system" 102) is generally located in a mobile platform 100. In various embodiments, the mobile platform 100 is an aircraft, and is referred to as aircraft 100. The audio processing system 102 embodies an air traffic control (ATC) transcription module 104 (also referred to herein as "control module" 104). The control module 104 may be separate from, or integrated within, a preexisting mobile platform management system, avionics system, cockpit display system (CDS), flight controls system (FCS), aircraft flight management system (FMS), or electronic flight bag (EFB).

The control module 104 is configured to receive and process the audio stream 107. In various embodiments, the audio stream 107 is provided by an audio panel 106. The control module 104 may additionally be operatively coupled to a user interface 116, and a database 114. During operation, the control module 104 selectively transmits buffer 166 (FIG. 2) contents, via signal 109, for further processing and use by external post-processing systems 118. These functional blocks, and their interaction, are described in more detail below.

In various embodiments, an audio panel 106 generates the audio stream 107 based on input received from a variety of audio input sources 108. In some embodiments, inputs to the audio panel 106 have been signal processed and prepared for use by the audio panel 106. In other embodiments, the audio panel 106 has integrated therewith a communications system configured to receive the various input signals and signal process them accordingly, for use by the audio panel 106. In those embodiments, the integrated communications system supports communications between the external audio input source(s) 112 and the audio panel 106, as well as from the on-board audio input sources 110 and the audio panel 106.

External source(s) 112 operatively coupled to the audio panel 106 may comprise any combination of the following: air traffic control (ATC), neighboring aircraft, sources of weather information, a Morse code generator, automatic terminal information service (ATIS), and other suitable command centers and ground locations. Data received from the external source(s) 112 is understood to be instantaneous (i.e., real time or current). Accordingly, the audio panel 106 may include a data link system, automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 112. On-board audio input sources 110 may comprise avionics systems, sensor systems, environmental detection systems, and the like.

The user interface 116 may include a user input device. The user interface 116 and the control module 104 are cooperatively configured to allow a user (e.g., a pilot, co-pilot, or crew member) to interact with the audio panel 106. Depending on the embodiment, the user interface 116 may be realized as a keypad, touchpad, keyboard, mouse, touch panel (or touchscreen), joystick, knob, line select key or another suitable device adapted to receive input from a user. When the user interface 116 is configured as a touchpad or touchscreen, it may be integrated with a display system. In embodiments having an audio panel 106, the audio panel 106 may be integrated with the user interface 116.

The optional data storage element or database DB 114 may maintain relevant platform 100 information, such as terrain data, airport-specific data, and aircraft-specific data. Information in the DB 114 may be used in generating various alerts that are on-board or external in nature. As such, DB 114 may be involved in the generation of terrain, obstacle, and traffic alerts, as well as aircraft system alerts. In addition, in various embodiments, the PTT library (FIG. 2, 156) is integrated into the DB 114.

As mentioned, the control module 104 performs the functions of the system 102. As used herein, the term "module" refers to any hardware, software, firmware, electronic control component, processing logic, and/or processor device, individually or in any combination, configured as a means for facilitating communications and/or interaction between the elements of the audio processing system 102 and performing additional processes, tasks and/or functions to support operation of the audio processing system 102, as described herein. Depending on the embodiment, the control module (FIG. 1, 104) may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Figure 2:
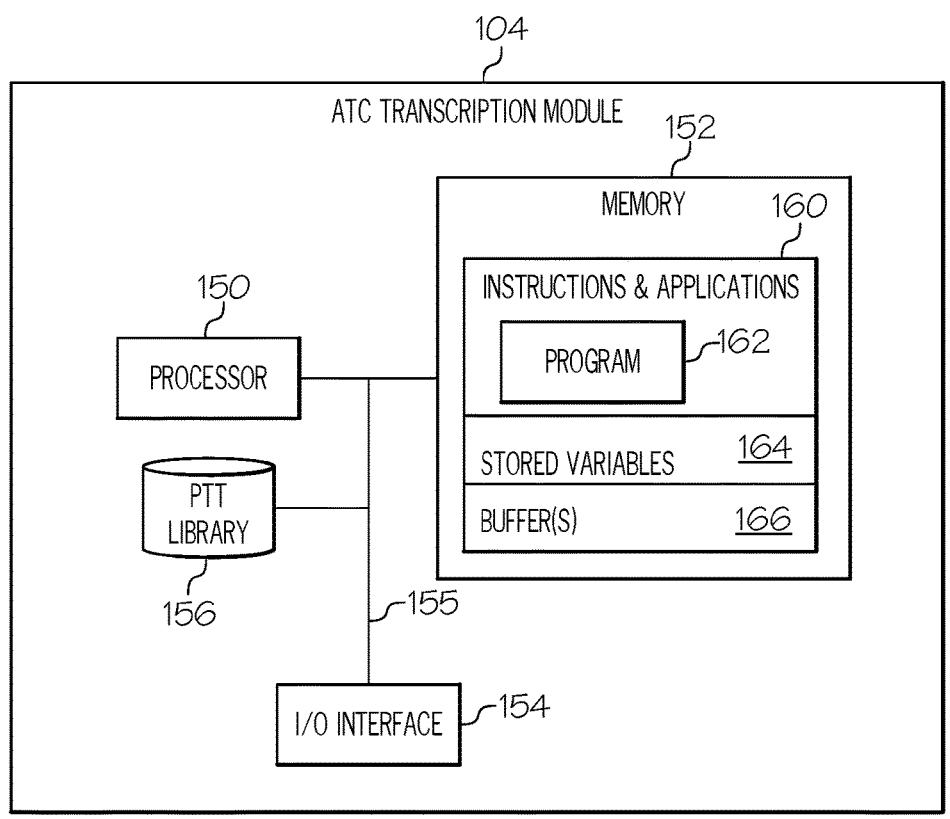
FIG. 2 is a block diagram of an ATC transcription module for an audio processing system, in accordance with an exemplary embodiment.

In an embodiment of the control module 104, depicted in FIG. 2, a processor 150 and a memory 152 form a novel processing engine or unit that performs the processing activities of the system 102. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 is a data storage element that maintains data bits and may be utilized by the processor 150 as storage and/or a scratch pad. The memory 152 may be located on and/or co-located on the same computer chip as the processor 150. In the depicted embodiment, the memory 152 stores instructions and applications 160 and one or more configurable variables in stored variables 164. Buffer 166 represents data storage for storing portions of an audio stream as described herein. Information in the memory 152 may be organized and/or imported from an external data source 140 during an initialization step of a process; it may also be programmed via the user interface 116.

A novel program 162 is embodied in the memory 152 (e.g., RAM memory, ROM memory, flash memory, registers, a hard disk, or the like) or another suitable non-transitory short or long term storage media capable of storing computer-executable programming instructions or other data for execution. The program 162 includes rules and instructions which, when executed, cause the audio processing system 102 to perform the functions, techniques, and processing tasks associated with the operation of the audio processing system 102 described herein.

During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads and executes the instructions embodied in the program 162. Additionally, the processor 150 is configured to, in accordance with the program 162: process received inputs (selectively, any combination of input from the audio panel 106 and the user interface 116); reference any of the databases; perform audio processing and PTT identification; and, transmit buffer 166 contents.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables communications between the control module 104 and other system 102 components, as well as with other external data sources 112 not already addressed herein, and as well as within the control module 104. The I/O interface 154 can include one or more network interfaces to communicate with other systems or components. The I/O interface 154 can be implemented using any suitable method and apparatus. For example, the I/O interface 154 supports communication from a system driver and/or another computer system. In one embodiment, the I/O interface 154 obtains data from external data source(s) 140 directly. The I/O interface 154 may also include one or more network interfaces to communicate with technicians, and/or one or more storage interfaces for direct connection to storage apparatuses, such as the database 156.

The control module 104 employs a PTT library comprising a plurality of (PTT) audio attributes. The PTT library may reside within the database 156 or within memory 152. Each audio attribute of the plurality of audio attributes includes an energy spectral frequency output of a respective push to talk (PTT) equipment during operation, specifically, during release. The audio attributes are from prerecorded samples. The audio attributes are used to separate out various voice communications (which includes voice communication from ATC). In operation, the audio attributes are used in a cross correlation step (FIG. 4, 412) in the identification of a PTT event. In many cases, the release of a PTT button is followed by silence; therefore, in order to more closely match an operating experience, the control module 104 may, during processing of the audio attribute, consider a PTT event to include a respective predetermined and configurable amount of silence after each occurrence of the energy spectral frequency output associated with an individual PTT button release.

In various embodiments, the database 156 also includes an aircraft-specific parameters database (comprising aircraft-specific parameters for a variety of aircrafts). In some embodiments, the database 156 is part of the memory 152. In various embodiments, the database 156 and the database 114 are integrated, either within the control module 104 or external to the control module 104. The PTT library and other database 156 contents may be uploaded and stored during an initialization step (FIG. 3, 302).

Figure 3:
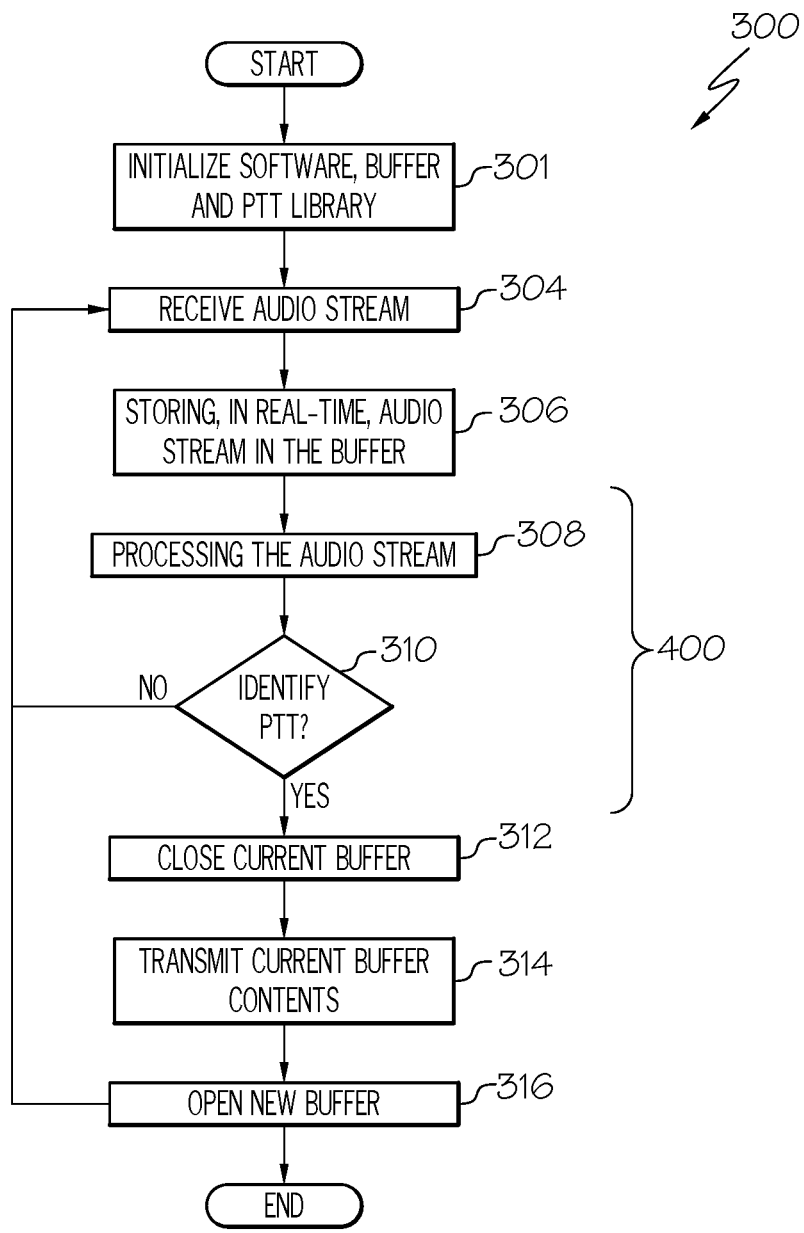
FIG. 3 is a flow chart for a method for audio processing, in accordance with an exemplary embodiment.
Figure 4:
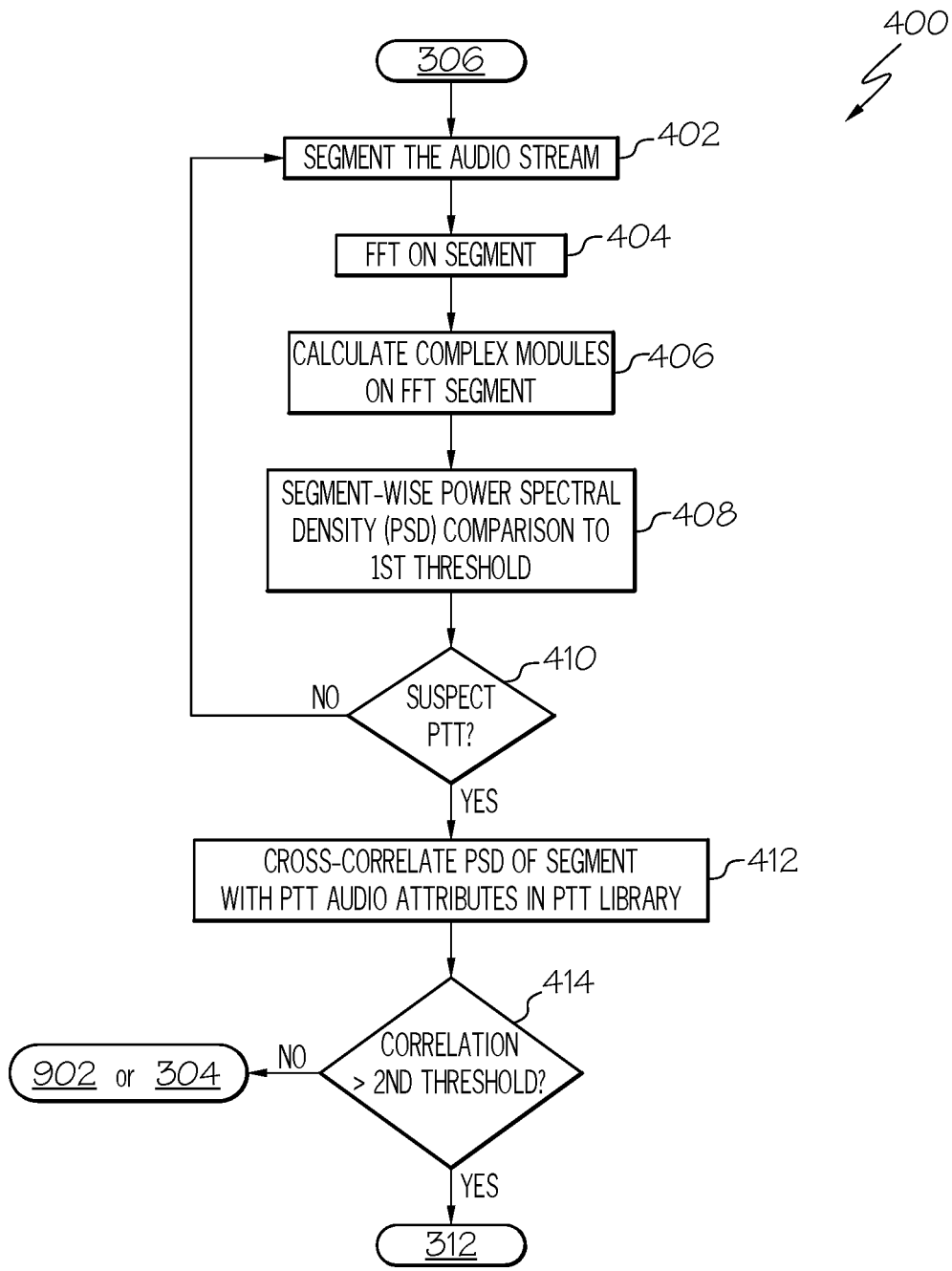
FIG. 4 is a flow chart providing more detail to the method shown in FIG. 3, in accordance with an exemplary embodiment.

As mentioned, the audio processing system 102 may be used to implement a method 300, as shown in the flow charts of FIG. 3 and FIG. 4. For illustrative purposes, the following description of method 300 may refer to elements mentioned above in connection with FIGS. 1-2. In practice, portions of method 300 may be performed by different components of the described system. It should be appreciated that method 300 may include any number of additional or alternative tasks, the tasks shown in FIG. 3 and FIG. 4 need not be performed in the illustrated order, and method 300 may be incorporated into a more comprehensive procedure or method having additional functionality not described in detail herein. Moreover, one or more of the tasks shown in FIG. 3 and FIG. 4 could be omitted from an embodiment of the method 300 as long as the intended overall functionality remains intact.

The method starts, and at 302 the audio processing system 102 is initialized. Initialization generally comprises uploading or updating instructions and applications 160 as required for operation of the audio processing system 102. This may include: the executable program 162; contents of the DB 114; contents of the PTT library in DB 156; and, any associated stored variables 164 (examples of variables for storage include: a first threshold, a second threshold, a segment size, etc.). Also part of initialization, at 302, a data storage location defined as a current buffer is initialized (the current buffer, and other buffers described herein are collectively located in buffer(s) 166). At 304, the audio stream 107 is received. As mentioned, the audio stream may be received from the audio panel 106. The audio stream 107 may include a plurality of utterances, wherein each utterance is an individual voice communication. At 306, the audio stream 107 is buffered or stored in the current buffer in buffer(s) 166; the buffering is performed in real-time.

At 308, the audio stream 107 is processed, and, at 310 the method 300 determines, based on the processing, whether it has identified a PTT event. The tasks of processing the audio stream at 308 and identifying a PTT event at 310 are expanded and further described in connection with FIG. 4, tasks 400. At 312, responsive to identifying a PTT event, the current buffer is closed; as mentioned earlier, this represents the completion of an utterance. At 312, therefore, an utterance in the audio stream 107 is stored in the current buffer. The contents of the current buffer are transmitted externally at 314 (via signal 109). As mentioned earlier, the buffer contents transmitted at 314 may include a predetermined and configurable amount of silence following the identified audio attribute, the signal 109 includes the transmitted buffer contents. In an embodiment, the signal 109 is received by a post processing system 118 and further signal processed to tag or identify utterances to associate them with individuals and/or with ATC. The post processing system 118 may be on-board the platform 100 or external, and may include various speech recognition engines and/or speech to text engines to generate and display alphanumeric information.

At 316, a new data storage location is opened and defined as the current buffer. In this manner, the "current buffer" is a location in the larger data storage element buffer(s) 166, identified by a pointer, that pointer moves to a new location in buffer(s) 166 each time an utterance is determined completed (based on the identification of a PTT at 310). After 316, the method 300 may return to receiving the audio stream 107 at 304, or end. Each cycle through the tasks 304 to 316 results in the buffering of another utterance.

Turning now to FIG. 4, the tasks 400 are described in more detail. At 402 the received audio stream 107 is broken into a plurality of time segments having a predetermined size. In various embodiments, the audio stream 107 is broken into time segments of equal size. In other embodiments, the audio stream 107 is broken into time segments of two or more sizes. The one or more predetermined sizes are configurable variables stored in stored variables 164. In one embodiment, the segment size is 200 milliseconds. From 402, each time segment of the plurality of time segments is processed to look for a PTT event, as follows. At 404, a fast Fourier transform (FFT) is performed on each segment of the plurality of time segments, generating a plurality of FFT segments. At 406, for each FFT segment of the plurality of FFT segments, a complex modulus is calculated, generating a plurality of CM segments. At 408, for each CM segment of the plurality of CM segments, a power spectral density comparison is made to a first threshold in order to determine whether a PTT event is suspected at 410. The first threshold is another configurable variable that is predetermined and stored in stored variables 164.

If, at 410, a PTT is not suspected in the CM segment, the method proceeds to 402 to analyze another segment. If, at 410, a PTT is suspected in the CM segment, the CM segment is cross correlated with entries in the PTT library in database 156. As mentioned, the PTT library includes audio attributes or energy spectral frequency outputs of various push to talk PTT equipment. The cross correlation is performed against a second threshold at 414. The second threshold is another configurable variable that is predetermined and stored in stored variables 164. In various embodiments, the second threshold is substantially 70 percent. If the cross correlation results exceed the second threshold, it is considered to have met a predefined accuracy threshold and the PTT event is considered identified, and the method proceed to 312. If the cross correlation results do not exceed the second threshold, the predefined accuracy threshold is not met, and the method 300 may proceed to 402 to segment and process another segment, or to 304 for continued receipt of the audio stream 107.

Accordingly, the exemplary embodiments described above provide a technologically improved audio processing system 102 and method that processes a complex audio stream 107, and monitor it for utterances. Utterances are determined to be portions of the audio stream 107 between sequential PTT events. Each PTT event serves to close a current buffer and begin a new one, thereby storing one utterance per buffer. The PTT events are thereby used to separate utterances. A PTT library in database 156 stores multiple device-specific PTT audio attributes, enabling the system 102 to further identify and tag individual speakers, such as ATC and a pilot. The presented system may be expanded beyond PTT events, and employ other unique audio attributes to distinguish utterances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for audio processing, comprising the steps of:
at a control module,
    initializing a data storage location defined as a current buffer;
    receiving, from an audio panel, an audio stream;
    responsive to receiving the audio stream, repeating the steps of:
        storing, in real time, the audio stream in the current buffer;
        identifying a push-to-talk (PTT) event by processing the audio stream based on (PTT) audio attribute, a PTT event defined as determining that a PTT button was released; and
        responding to the identified PTT event by, (i) closing the current buffer, (ii) opening a new data storage location, and (iii) defining the new data storage location as the current buffer.

2. The method of claim 1, wherein the audio stream comprises comingled audio signals from at least two different sources.

3. The method of claim 2, wherein signal processing the audio stream comprises breaking the audio stream into a plurality of time segments of equal size.

4. The method of claim 3, wherein signal processing the audio stream further comprises:
for each time segment of the plurality of time segments,
    generating a complex modulus (CM) segment by performing a fast Fourier transform (FFT) and a complex modulus on the time segment.

5. The method of claim 4, wherein identifying a PTT event further comprises:
for each CM segment,
    comparing a power spectral density (PSD) of the CM segment to a first threshold; and
    identifying a suspected PTT event in a CM segment when the PSD of the CM segment exceeds the first threshold.

6. The method of claim 5, wherein identifying a PTT event further comprises:
responsive to identifying a suspected PTT event in a CM segment, cross correlating the CM segment with an audio attribute in a PTT library; and
determining that the cross correlation meets a predefined accuracy threshold.

7. The method of claim 4, further comprising, subsequent to identifying a PTT event, transmitting contents of the current buffer to a post processor.

8. A system for audio processing, comprising:
an audio panel for providing an audio stream comprising two or more utterances; and
a control module comprising a processor and a memory, the control module configured to,
receive the audio stream;
store, in real time, the audio stream in a current buffer in memory;
break the audio stream into a plurality of time segments of equal size; and
for each time segment of the plurality of time segments, process the time segment with a push-to-talk (PTT) audio attribute to look for a PTT event, a PTT event defined as a PTT button is released; and
upon identifying the PTT event, respond to the identified PTT event by, (i) closing the current buffer, (ii) opening a new data storage location, and (iii) defining the new data storage location as the current buffer.

9. The system of claim 8, wherein the control module is further configured to:
for each time segment of the plurality of time segments, generate a complex modulus (CM) segment by performing a fast Fourier transform (FFT) and a complex modulus on the time segment.

10. The system of claim 9, wherein the control module is further configured to:
for each CM segment,
compare a power spectral density (PSD) of the CM segment to a first threshold; and
identify a suspected PTT event in a CM segment when the PSD of the CM segment exceeds the first threshold.

11. The system of claim 10, wherein the control module is further configured to:
responsive to identifying a suspected PTT event in a CM segment,
identify the PTT event by (i) cross correlating the CM segment with a PTT audio attribute, and (ii) determining that the cross correlation meets a predefined accuracy threshold.

12. The system of claim 11, further comprising, subsequent to identifying the PTT event, transmitting contents of the current buffer.

13. The system of claim 12, wherein the push to talk (PTT) audio attribute is one of a plurality of PTT attributes, and the PTT attributes are prerecorded from the audio panel.

14. The system of claim 13, wherein the transmitted contents of the current buffer include a respective predetermined amount of silence.

15. An Air Traffic Control (ATC) transcription module, the ATC transcription module comprising:
a processor and a memory, the processor configured to,
receive an audio stream comprising an ATC utterance;
store, in real time, the audio stream in a current buffer in memory;
break the audio stream into a plurality of time segments of equal size; and
for each time segment of the plurality of time segments, generate a complex modulus (CM) segment by performing a fast Fourier transform (FFT) and a complex modulus on the time segment;
process the CM segment with a push-to-talk (PTT) audio attribute to look for a PTT event, a PTT defined as a PTT button is released; and
upon identifying the PTT event, respond to the identified PTT event by, (i) closing the current buffer, (ii) opening a new data storage location in memory, and (iii) defining the new data storage location as the current buffer.

16. The ATC transcription module of claim 15, wherein the processor is further configured to:
for each CM segment,
compare a power spectral density (PSD) of the CM segment to a first threshold; and
identify a suspected PTT event in a CM segment when the PSD of the CM segment exceeds the first threshold.

17. The ATC transcription module of claim 16, wherein the processor is further configured to:
responsive to identifying a suspected PTT event in a CM segment,
identify the PTT event by (i) cross correlating the CM segment with a PTT audio attribute, and (ii) determining that the cross correlation meets a predefined accuracy threshold.

18. The ATC transcription module of claim 16, wherein the processor is further configured to, subsequent to identifying the PTT event, transmit contents of the current buffer.

19. The ATC transcription module of claim 16, wherein the audio stream is provided by an audio panel, and the push to talk (PTT) audio attribute is prerecorded from the audio panel.

20. The ATC transcription module of claim 18, wherein the transmitted contents of the current buffer include a respective predetermined amount of silence.

* * * * *